(No Model.)
A. B. HOMER.
SPOOL OR BOBBIN HOLDER.
No. 516,332. Patented Mar. 13, 1894.
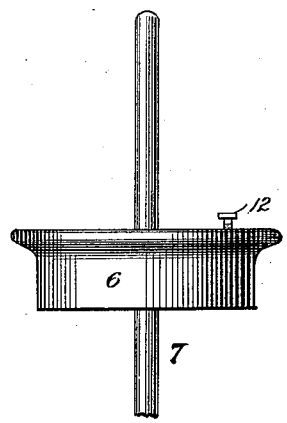
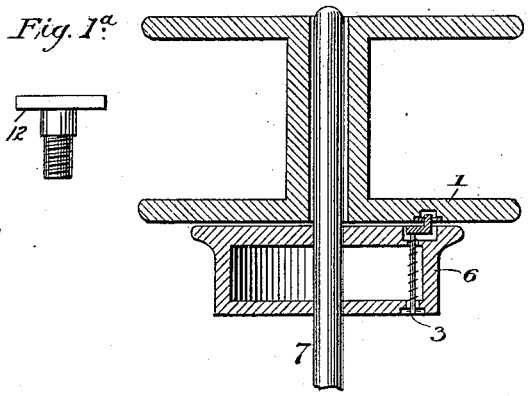
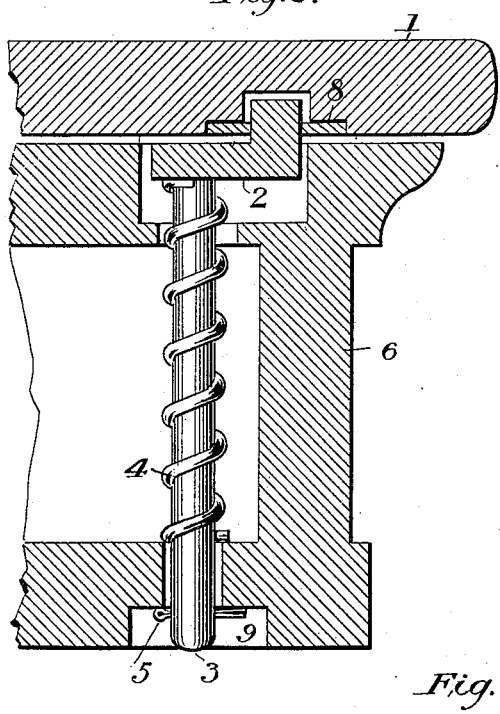
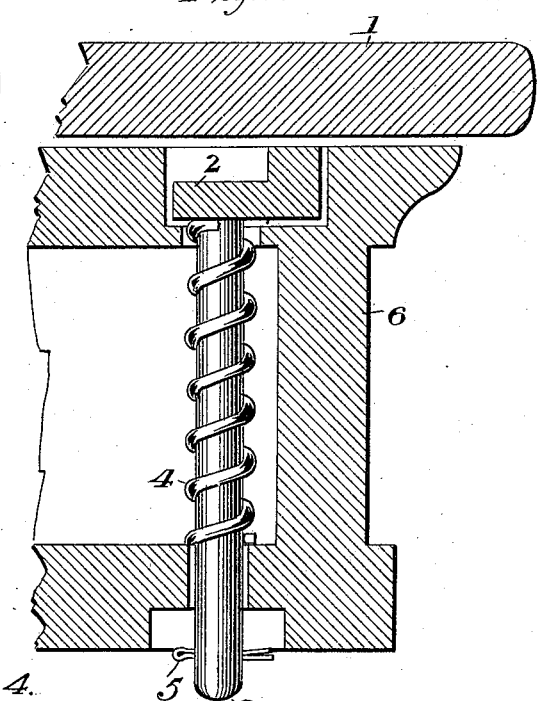
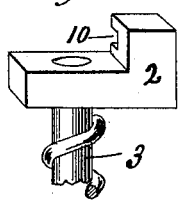
Witnesses:
Sherwood Babin
Arthur P. Homer
Inventor:
Arthur B. Homer
THE NATIONAL LITHOGRAPHING COMPANY,
WASHINGTON, D. C.

UNITED STATES PATENT OFFICE.

ARTHUR B. HOMER, OF GALVESTON, TEXAS.

SPOOL OR BOBBIN HOLDER.

SPECIFICATION forming part of Letters Patent No. 516,332, dated March 13, 1894.

Application filed April 13, 1892. Serial No. 428,972. (No model.)

*To all whom it may concern:*

Be it known that I, ARTHUR B. HOMER, residing at Galveston, in the county of Galveston and State of Texas, have invented certain new and useful Improvements in Spool or Bobbin Holders, of which the following is a specification.

This invention relates to spool holders, and it consists in the novel construction and combination of the parts hereinafter fully described and claimed.

In the drawings: Figure 1 is a side view of the spool holder commonly used, and Fig. 1ª is a detail side view of the catch ordinarily attached to it. Fig. 2 is a vertical section of a portion of the flange of a spool holder provided with a spring-actuated catch according to this invention, and showing the same pressed back and before engaging with the flange of the spool. Fig. 3 is a view similar to Fig. 2 but shows the spring-actuated catch engaging with the flange of the spool. Fig 4 is a perspective view of the head of the catch. Fig. 5 is a vertical section of the spool holder and spool, provided with the spring-actuated catch.

An ordinary spool 1 is provided with a recess in one of its flanges, and has a washer 8 let into this recess. The spool holder consists of a spindle 7 upon which a flange 6 is secured. A catch 12 projects from the flange 6 and engages with the washer in the spool.

In order to save the spool from jar when dropped into position, instead of making the catch a fixture as shown in Fig. 1, a vertically retractible catch is used. This novel catch consists of a stem 3 which slides vertically in the flange 6 and is provided with a head 2 having a notch 10 for engaging with the washer in the spool. The head 2 is normally held in its raised position by the spring 4, which is wound around the stem and concealed within the flange. A recess 9 is formed in the under side of the flange 6, and 5 is a retaining pin which passes through the end of the stem 3 and is hidden in the recess when the catch is in its raised position. When the spool is dropped over the upper part of the spindle it falls on the head of the spring-actuated catch which slips back as shown in Fig. 2 before interlocking with the spool.

What I claim is—

1. In a spool holder, the combination, with a spindle having a flange secured on it, of a retractible spring-actuated catch provided with a projecting head having a notch 10, the said catch being supported in a hole in the said flange and operating to connect a spool or bobbin to the said spindle, substantially as set forth.

2. In a spool holder, the combination, with a spindle having a flange secured on it, said flange having a recess 9 in its under side; of the catch provided with the stem 3 and projecting head 2, the pin 5 passing through the end of the stem, and the actuating spring 4 wound around the stem and operating to throw the said catch forward into engagement with a spool or bobbin, substantially as set forth.

ARTHUR B. HOMER.

Witnesses:
L. SHERWOOD SABIN,
ARTHUR P. HOMER.